(12) United States Patent
Leucht-Roth et al.

(10) Patent No.: US 9,946,325 B2
(45) Date of Patent: Apr. 17, 2018

(54) INTERPROCESSOR POWER STATE TRANSITIONS

(71) Applicant: Intel IP Corporation, Santa Clara, CA (US)

(72) Inventors: Ulrich Leucht-Roth, Munich (DE); Pavel Peleska, Graefelfing (DE)

(73) Assignee: Intel IP Corporation, Santa Clara, CA (US)

( * ) Notice: Subject to any disclaimer, the term of this patent is extended or adjusted under 35 U.S.C. 154(b) by 93 days.

(21) Appl. No.: 15/198,491

(22) Filed: Jun. 30, 2016

(65) Prior Publication Data

US 2018/0004273 A1    Jan. 4, 2018

(51) Int. Cl.
*G06F 1/32*    (2006.01)

(52) U.S. Cl.
CPC .......... *G06F 1/3215* (2013.01); *G06F 1/3278* (2013.01); *G06F 1/3287* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10

See application file for complete search history.

(56) References Cited

U.S. PATENT DOCUMENTS

| 8,359,071 | B2 * | 1/2013 | Basaralu | G06F 1/3209 370/276 |
| 9,213,393 | B2 * | 12/2015 | Cooper | G06F 1/3234 |
| 9,256,268 | B2 * | 2/2016 | Wang | G06F 1/3203 |
| 2013/0007483 | A1 * | 1/2013 | Diefenbaugh | G06F 1/3206 713/320 |
| 2013/0262883 | A1 * | 10/2013 | Saunders | G06F 13/42 713/300 |
| 2013/0311809 | A1 * | 11/2013 | Sood | G06F 1/3209 713/323 |
| 2015/0074440 | A1 * | 3/2015 | Cherukuri | G06F 1/3287 713/324 |
| 2016/0274923 | A1 * | 9/2016 | Harriman | G06F 1/3203 |

* cited by examiner

*Primary Examiner* — Zahid Choudhury
(74) *Attorney, Agent, or Firm* — Alliance IP, LLC

(57) ABSTRACT

A modem identifies an idle condition associated with a data network to be accessed and determines an opportunity to enter a first one of a set of low power device states based on the idle condition, where the set of low power device states further includes a second low power device state, and a host device consumes less power in the first low power device state than in the second low power device state. A notification is sent to an application processor of the host device that the modem is to enter a sleep state, where the notification identifies the first low power device state, and a low power link state is entered corresponding to the first low power device state based on a signal from the application processor. The low power link state applies to a link coupling a communications processor of the modem to the application processor.

20 Claims, 15 Drawing Sheets

INTERPROCESSOR POWER STATE TRANSITIONS

FIELD

This disclosure pertains to computing system, and in particular (but not exclusively) power management in point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical. However, as processor power and bus speeds increase, stress is placed on the power-sensitive devices, such as battery powered devices in mobile networks and Internet-of-Things (IoT) systems, among other examples.

BRIEF DESCRIPTION OF THE DRAWINGS

Like reference numbers and designations in the various drawings indicate like elements.

DETAILED DESCRIPTION

Figure 1:
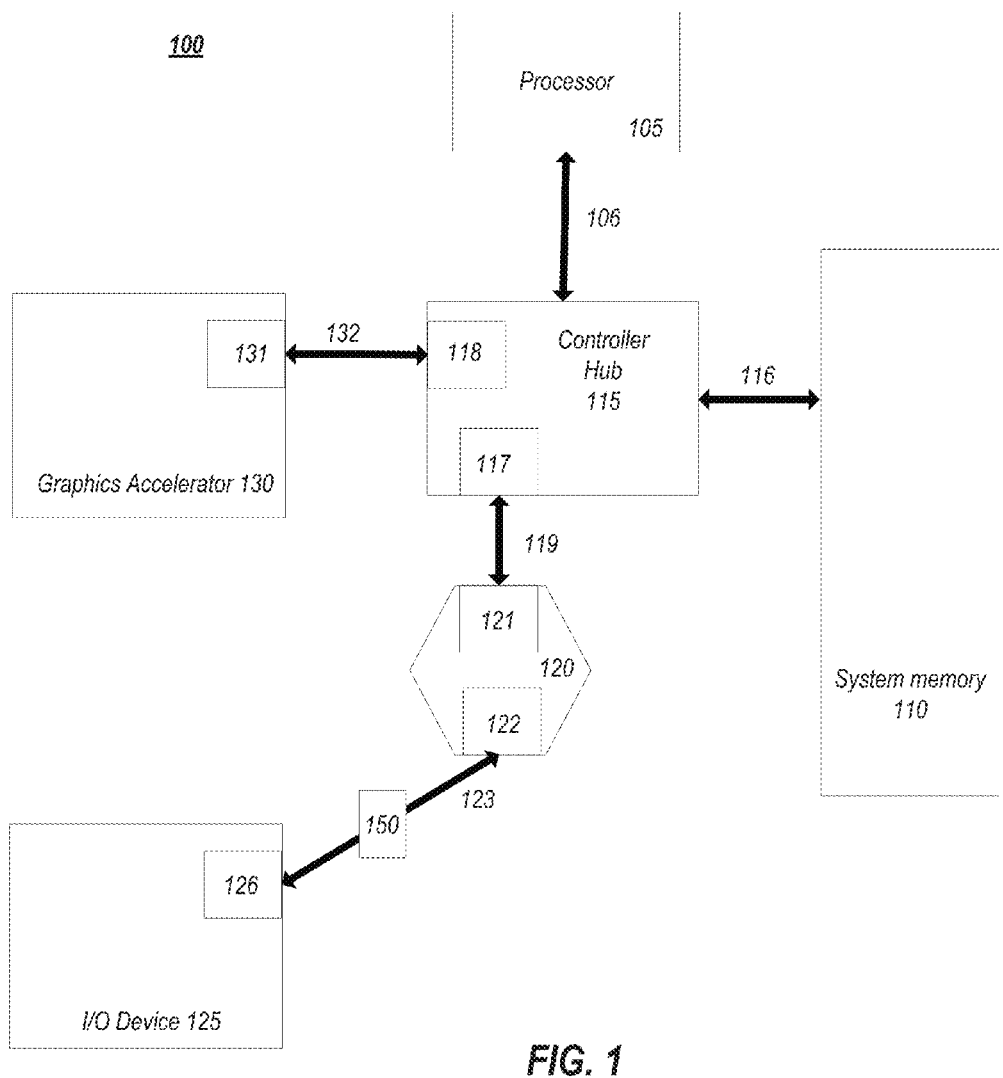
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In some cases, the point-to-point interconnects are bidirectional, in that data can be both sent and received on portions of the link at the same time. In another embodiment, link 106 includes a serial, differential interconnect architecture that is compliant with a different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Other devices can be accessed through a controller hub 115, including modems and communications modules. A point-to-point interconnect can be provided through which a controller hub 115 (and processor 105) can interface and transact with communication processing elements of the modules. Accordingly, controller hubs, processors, and communications modules can be augmented according to some of the features and principles set forth herein.

Figure 2:
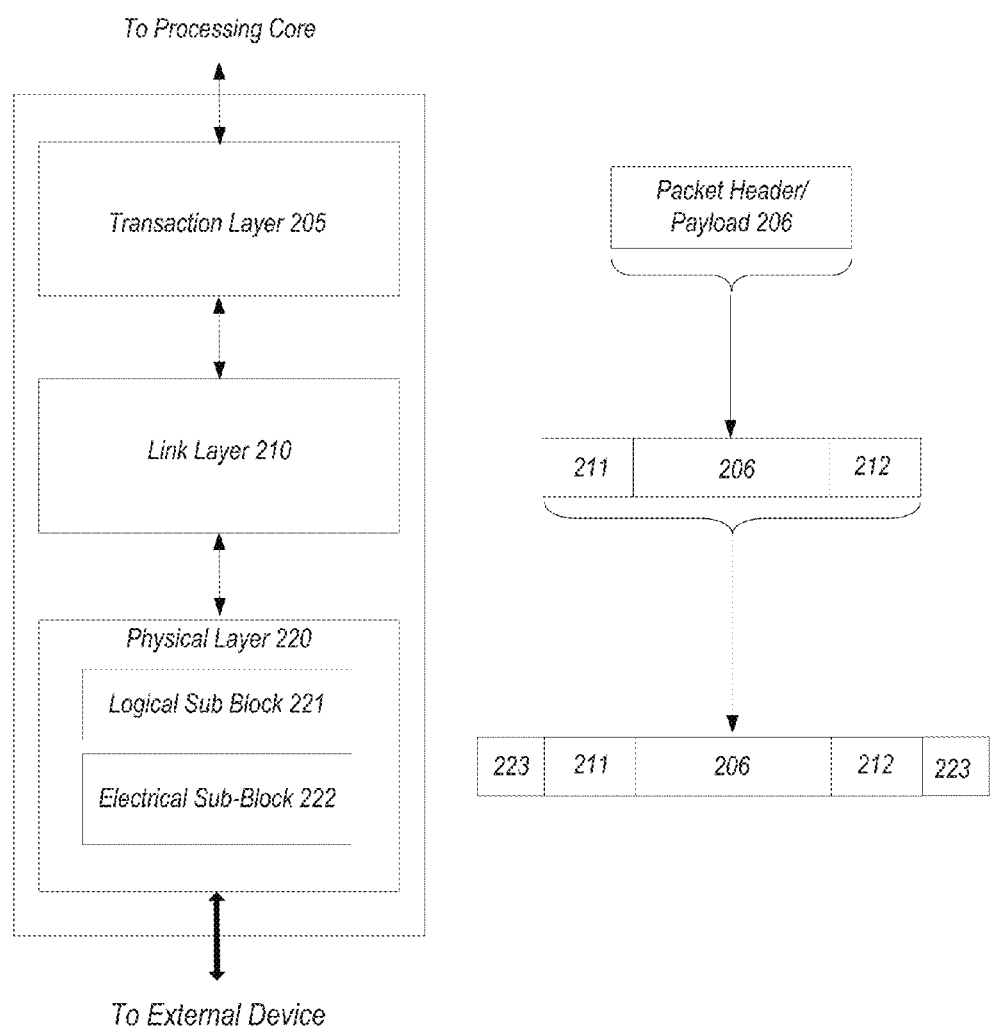
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
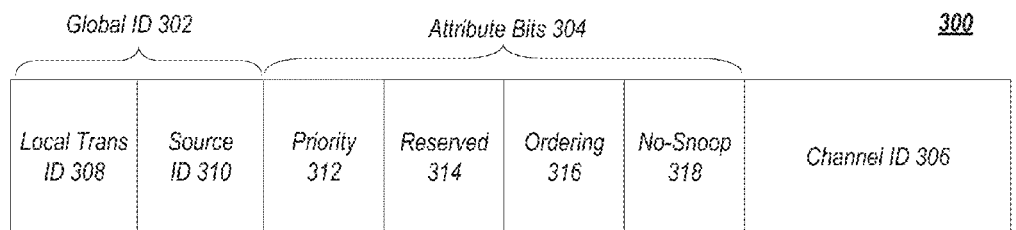
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
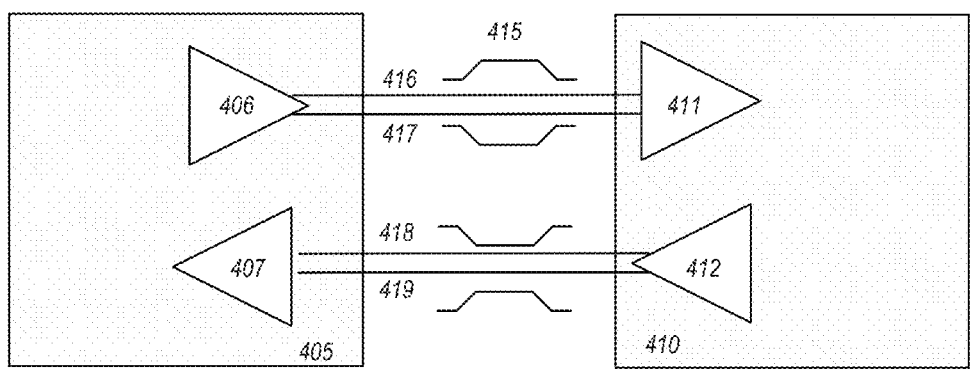
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Figure 5:
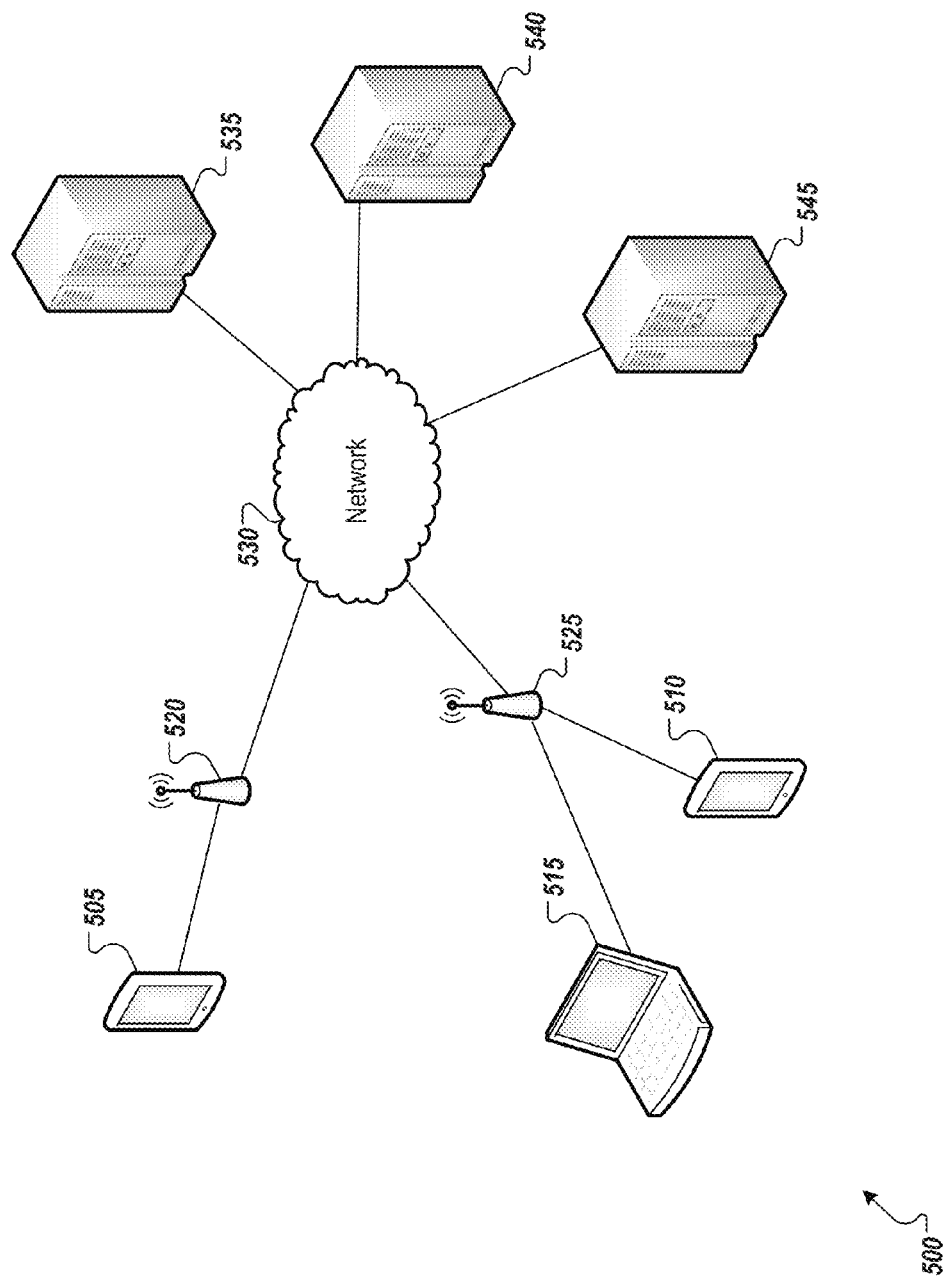
FIG. 5 illustrates an example system including host devices coupled to one or more data networks.

Turning to FIG. 5, PCIe and other point-to-point bidirectional interconnects can be utilized in a variety of application. As an example, FIG. 5 shows a block diagram illustrating a system 500 including one or more host devices 505, 510, 515, such as mobile communication devices (e.g., smartphones, feature phones, laptops, netbooks, tablets, etc.) equipped with wireless communication modems or other communication modules enabling the devices to communicate with broadband data networks (e.g., 530) via access points 520, 525, such as provided on a cell tower, private access point, or other access point. The host devices 505, 510, 515 can communicate over the network 530 with servers (e.g., 535, 540, 545) to send requests and receive data in response, which may be used by the host devices 505, 510, 515 to provide services and features to the host device's user. As an example, a user may utilize a local client application on the user's device (e.g., 505) to consume services and data relating to a particular social network. Through the user device 505, the user can access a backend server 535 hosting data for the social network and have various data and services delivered to the host device 505 over the broadband network 530. Such networks 530 can utilize a variety of different technologies including 3G, 4G, LTE, and other current (and future) broadband data networks. A modem or other communication module can be provided on each of the host devices (e.g., 505, 510, 515) to allow the host device to access these networks 530. For instance, as shown in the simplified block diagram 600 of FIG. 6, a host device 505 can include an application processor 605 to support and execute instructions (e.g., hosted in application processor memory (or "system memory") 610) implementing an operating system (e.g., a real-time operating system (RTOS)) 615, one or more applications 620, and other features and peripherals 625 (e.g., display devices, cameras, microphones, speakers, etc.) hosted on the device 505, including a modem 630 or other communications module enabling communication between the device 505 and other systems over one or more networks.

Figure 6:
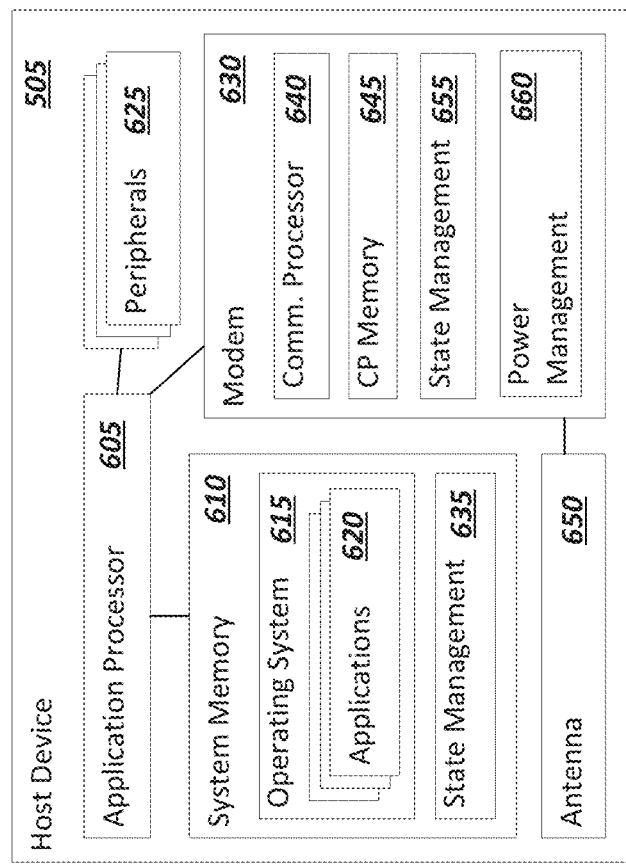
FIG. 6 is a simplified block diagram of an example host device.

Continuing with the example of FIG. 6, an application processor 605 of a device 505 may communicate with peripherals and other components (e.g., 625, 630) of the device 505 using a root hub or other controller. An application processor 605 can further utilize state management logic 635 to control transitions between device and/or link states. Such state transitions can be dictated by one or more corresponding state machines. For instance, state management logic 635 can include logic for managing and transitioning between PCIe link states (e.g., L0, L1, L1.2, L2, etc.).

In some implementations, a communications module, such as modem 630, may include a communications processor device 640 with related memory 645. The modem 630 may further include an antenna 650 with which signals are transmitted and received to/from a network. Such signals may be generated and first processed by the communications processor 640 before data from these signals are transmitted (over an interprocessor link) to the application processor for further processing (e.g., in connection with functions of one or more applications (e.g., 620) or other devices (e.g., 625)).

While in some implementations and instances, the power state of a link connecting a communications module with the application processor 605 may be driven by state management logic 635 of the host, the communications module (e.g., 630) may also be provided with state management logic 645. For instance, a modem 630 may have device states or communication states different from those of the host or other peripheral devices and state management logic 645 can manage these states. For example, state management logic 645 may manage states corresponding to communication activity of the communications module on a particular network (e.g., LTE DRX states, among other examples). In still other examples, power management logic 660 can be provided on the communications module (e.g., 630) to allow at least some power management decisions of the host to be driven or at least influenced by the communications module. For instance, link states and link state transitions of an interprocessor link connecting the communications module to the application processor may be controlled, at least partially, by the communications module based on determinations using power management logic 660 of the communications module (e.g. 630), among other examples.

In some systems, PCIe is becoming the standard interface for connections between the wireless modems (and the communications processor (CP) within the modem) and application processor (AP) of mobile computing devices. In some aspects, the performance provided through PCIe or other high speed interconnects may be more than is needed for some mobile applications and may additionally present power consumption issues for such devices. In some implementations, the power consumption of the point-to-point interface (e.g., PCIe interface) is addressed by actively power managing the link using a lower power PCIe power state L1.2. While such an approach may be suitable for some mobile device applications, as devices become smaller and smaller, such as implemented in wearable and Internet of Things (IoT) devices, traditional power management techniques and states may prove insufficient. For instance, smaller device categories may have relatively severe power constraints given not only the smaller batteries used in such devices and the sometimes higher lifespan and operation time requirements for such batteries, among other example factors.

As noted above, a communications module, such as a cellular modem (e.g., 630) may itself support multiple power states. Modem power states may be different from the set of power states of the application processor and/or of the link (e.g., as defined by an interconnect specification (e.g., PCIe)). As an example, a modem for connecting to a wireless data network (e.g., an LTE modem) may utilize power states defined in a discontinuous reception (DRX) protocol. In one example, the lowest modem power state in idle scenarios may be modem deep sleep and the modem may only be allowed to enter deep sleep after a handshake with application processor. In some traditional implementations, a modem is only able to request deep sleep using PCIe Active State Power Management (ASPM) in D0 (or the L1.2 link state). In L1.2 state, however, there remains power consumption by the device due to state retention in accordance with the L1.2 state. Extra power consumption during idle, even at the microwatt level, may be untenable for some mobile devices. Indeed, it may be favorable to instead have a device idle in a lower device power state (i.e., lower than D0), such as the PCIe $D3_{cold}$ device power state where power can be further reduced to almost 0. Such low device power states, however, may require a full initialization and reconfiguration of the device upon exit from D3 (e.g., D3cold) to D0. A full initialization of the Function to D0active state may yield a significant power burden, thereby also limiting the applicability of D3 in traditional systems, where such costly exits only become viable when the device is subject to long idle times (and where the frequency of wake events and re-initialization are low).

In one implementation, a system can be provided that utilizes a modified inter-process communication (IPC) protocol (between an application processor and communications processor of a battery-powered computing device) that allows a modem to direct selection of a particular one of a plurality of idle device power states (e.g., D0 or D3) based on a modem-specific state (e.g., a DRX state) or transmitting activity detected and/or predicted at the modem and its data network. Such a solution can promote across-layer optimization of host device (or user equipment (UE)) power consumption across layers according to modem connection state or activity level. Further, in some implementations, power management across an IPC link may additionally be enhanced by an improved D3 exit, promoting more frequent use of D3 idle states for interprocessor links, among other example advantages and features.

Figure 7:
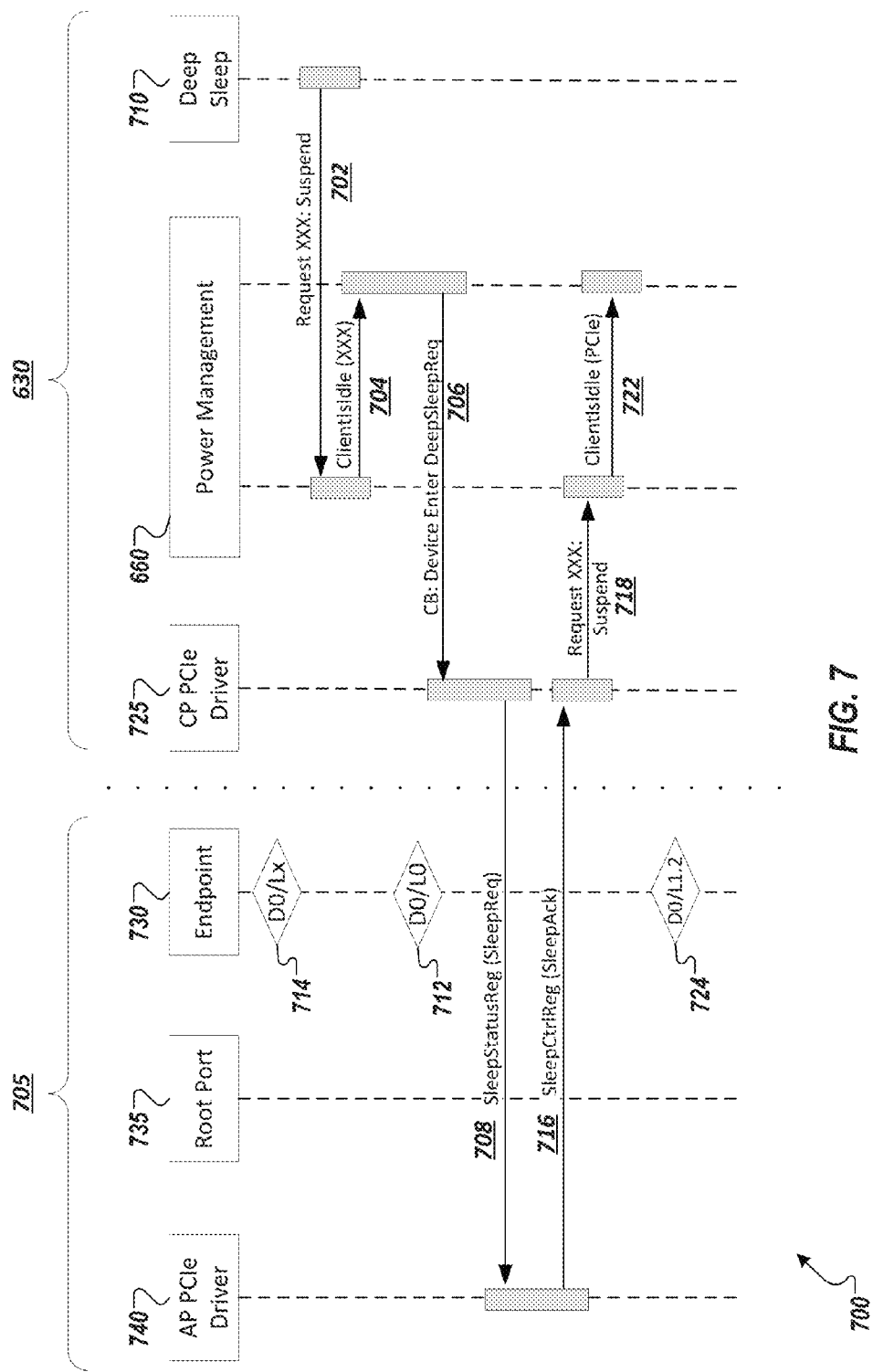
FIG. 7 is a simplified flow diagram illustrating power state transitions associated with a communications processor and an application processor of an example host device.

Turning to FIG. 7, a simplified flow diagram 700 is shown illustrating a traditional flow for a link state transition for an interprocessor communications link coupling an application processor 605 and communications processor 640. In traditional systems, entry into a D3 device power state is controlled solely by the host system 705 (e.g., using the system's application processor) based on coarse grain policies such as policies based on idle time (e.g., triggered after 5 sec. inactivity), system state (e.g., display off detected), or system connection state (e.g., airplane mode enabled), among other examples. Such course-grained policies do not allow the system to take advantage of a corresponding DRX interval or other modem-centric measures or state decisions, whether for long- or short-connected DRX intervals or even paging DRX. While DRX state information may be forwarded dynamically to the host system 705 for consideration by the host system 705 in device power state transitions, such a solution may be too costly from a power standpoint, given the increased message exchange used to convey such information. Further, host-based device power state transition decisions may be controlled, at the host side, by software, which may lack the speed to react suitably to DRX state information changes, among other potential issues.

As shown in FIG. 7, entry into a low power D0 link state can be reactive to a request 702 from a modem 630. For instance, a suspend request 702 can be sent by a deep sleep module 710 to power management logic 660 of the modem 630. When the communications module, such as a modem, reaches an idle loop due to inactivity (e.g., no data to send or receive from the network) it may send a sleep notification request to the host (SleepStatusReg(SleepReq)). Accordingly, upon determining that the modem 630 is to enter a deep sleep state, the power management logic 710 can send a notification 706 to the PCIe driver 725 of the communications processor for forwarding over an interprocessor link (e.g., a PCIe-compliant notification over a PCIe link) to the host 705 (e.g., via application processor PCIe driver 740). In one implementation, the sleep state machine of the modem may be triggered by messaging through registers corresponding to the interprocessor link. For instance, a SleepStateReg(mode) message can be sent together with or followed by an interrupt (e.g., a message signaled interrupt (MSI)), the SleepStateReg(mode) serving to set a register value (e.g., in host memory to indicate a sleep request and sleep mode to the host. Accordingly, in one implementation, the notification 708 sent from the communications processor can be a SleepStatusReg message indicating a sleep state to be entered by the modem 630. This message may be defined to be sent over the interprocessor link while the link is in an L0 active link state 712 (with the devices in a D0 device power state). In some cases, the link may first transition to the L0 state (e.g., from another D0 state 712) in order for the message 714 to be sent. The application processor can respond to the notification with an acknowledgement 716, which is forwarded back to the communications processor (at 725) and communicated further (as a ClientIsIdle message 722) to the power management logic 660 of the modem 630. The ClientIsIdle message 722 may signal the modem to start a sequence to enter modem low power state (e.g., a deep sleep state). In some implementations, the modem 630 is only permitted to enter deep-sleep upon receiving the acknowledgement response 716 (SleepCtrlReg (SleepAck)) back from the host 705 at the modem 630. Receipt of the acknowledgment 716 can permit the power management logic 660 to complete entry into the deep sleep state. The host 705, upon receiving and acknowledging the sleep request 708 can determine that the link between the host 705 and modem 630 can be brought down to and remain in an idle state 724 (as determined by the host) to account for the modem's sleep state. For instance, the link can be transitioned to a PCIe D0/L1.2 idle state 724 in response to the sleep notification 708.

As illustrated in the example of FIG. 7, in some implementations, a communications processor can send an IPC message (with this IPC link in D0 (e.g., Lx)) to the application processor to indicate that the modem is in an arbitrary idle state, which the application processor may use to approve entry into the idle state and trigger a transition of the IPC link to a lower power, idle link state (e.g., D0/L1.2). In another example, a policy (and corresponding capability defined in a capability register) can be defined such that the communications processor supplements its deep sleep notification IPC protocol message with a request, recommendation, or hint to indicate a particular one of a plurality of defined idle or low power link states the link should enter D3 (instead of a D0 idle state), based on a network activity level determined by the corresponding modem. For instance, the communications processor can generate a hint to indicate a determination by the communications processor that the actual idle interval of its corresponding DRX state justifies entry into a D3 rather than a D0 state (such as PCIe L1.2). As the entry/exit latencies and power consumption of state transitions differs (to a sometimes large extent) between D0/L1.2 and D3/L2, such hints provided by the communications processor can allow the system to more effectively and accurately idle to achieve enhanced power efficiency of the device. In other words, an example IPC protocol (e.g., PCIe) may be augmented to support deep sleep initiated from the modem based on detected tendencies in the DRX state transitions, be it implementations utilizing connected DRX, paging DRX, or LTE catM DRX for machine-to-machine (M2M) system (e.g., IoT systems), among other examples.

Figure 8A:
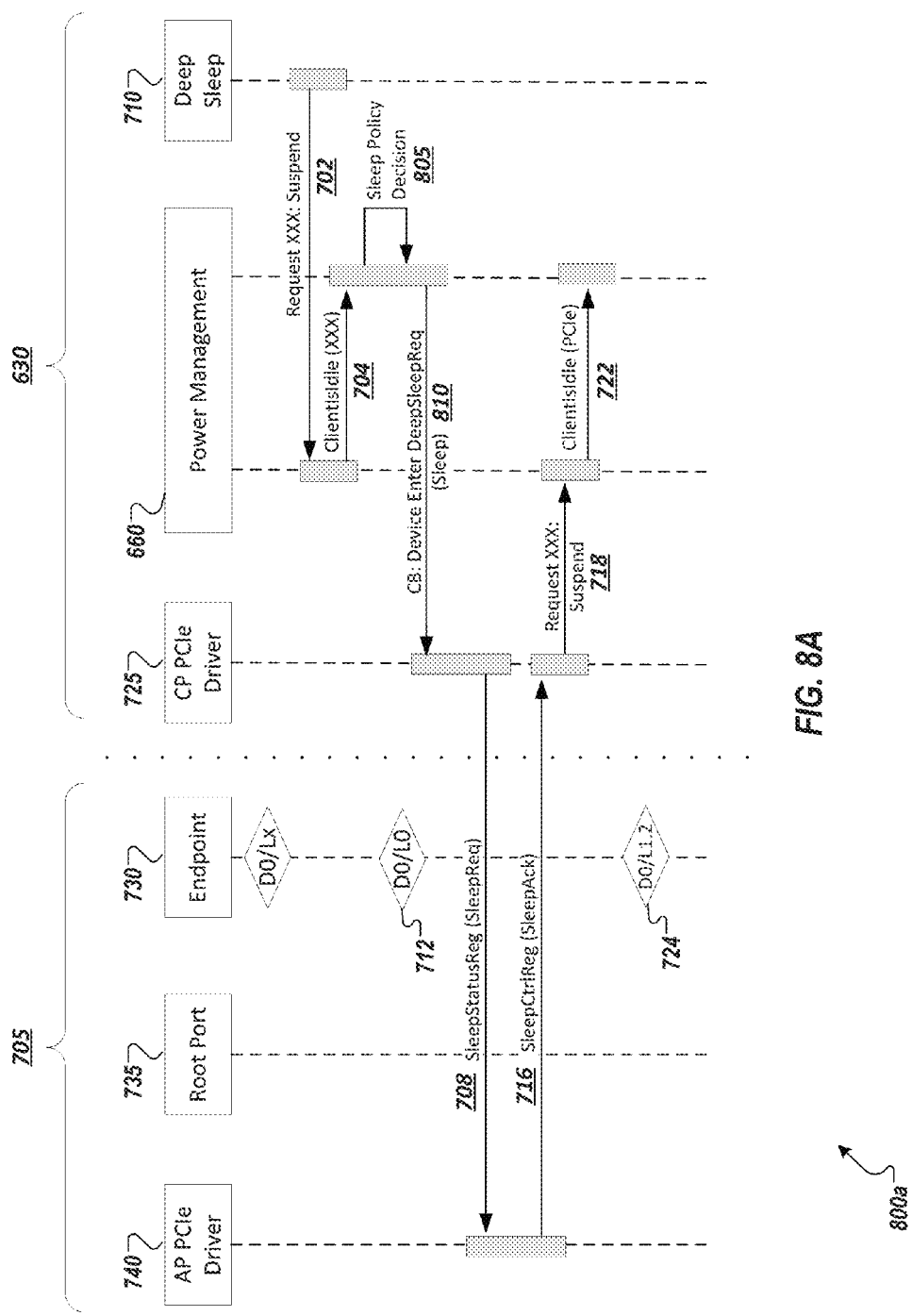
FIGS. 8A-8B are simplified flow diagrams illustrating power state transitions associated with a communications processor and an application processor based on a policy decision.

For instance, turning to FIG. 8A, a simplified flow diagram is shown illustrated an enhanced capability of a modem (and corresponding power management logic) to provide direction to the host 705 as to which specific low power link state to transition an interprocessor link between the host 705 and modem 630 to in connection with a sleep request or notification by the modem 630. For instance, a deep sleep module 710 of the modem 630 can again determine an opportunity to enter a deep sleep state and send a suspend request 702 to the power management logic 660, resulting in a ClientIsIdle message 704, as in the example of FIG. 7. However, in the example of FIG. 8A, rather than simply sending a sleep notification to the host and allowing the host to dictate the power state to be applied to the interprocessor link, power management logic 660 may assess (at 805) conditions at the modem (and its corresponding data network) to determine which of a plurality of available sleep states to recommend based on these conditions. The assessment can be a decision based on a sleep policy decision 805 determined for the particular host and modem. In one example, the policy decision 805 can be based on an actual, current idle interval determined for the network interface and serving as the basis of the current sleep request.

In the example of FIG. 8A, the power management logic 660 of the modem 630 may determine that the idle interval for the modem/network interface is sufficiently long to recommend a transition to a higher-power idle power state within the plurality of low power states. In one example, the "sleep" state may correspond to a D0 idle state, such as PCIe link state L1.2 and the modem 630 may accordingly send a sleep notification 810 with an appended hint indicating a recommendation for the interprocessor link to enter the "sleep" state (as opposed to an ever lower power idle state available for the link) in connection with the requested sleep condition of the modem 630. This request may be similar to a typical or default sleep request 708 sent to the host to cause an acknowledgement 716 and entry into a D0/L1.2 state, as in the example of FIG. 7. Indeed, as in the example of FIG. 7, upon receiving the acknowledgment 716 from the application processor in the example of FIG. 8A, the modem can then enter its sleep state, with the link being brought down to an L1.2 state.

Figure 8B:
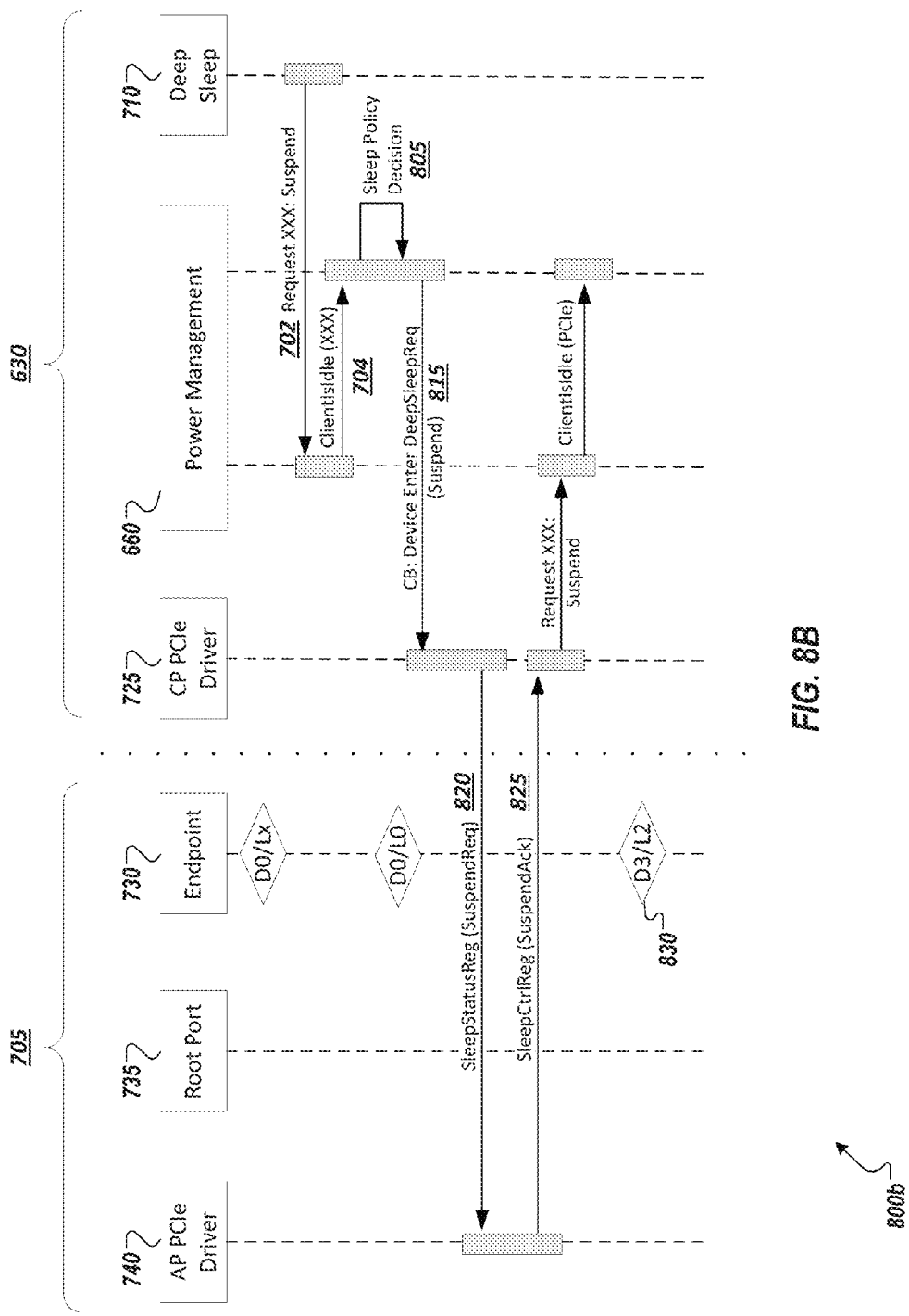

In another example, illustrated in the simplified flow diagram illustrated in FIG. 8B, a suspend request 702 and ClientIsIdle message 704 can be sent in connection with a deep sleep module 710 determining an opportunity to enter a sleep state. In response, the current attributes (e.g., idle interval) of the modem 630 idle condition can be assessed to again perform a sleep policy decision 805. However, in this example, the power management logic 660 can determine that the attributes of the present idle condition justify transition into a lower power state that will likely result in a net power savings (despite what can be higher link exit power costs for the lower power state). In this example, the sleep policy decision 805 results in a determination to recommend a lower power idle state, or "suspend" state. A sleep notification 815 can be generated, which includes an indication of the sleep policy decision result, namely a hint to enter a lower power "suspend" state. In one example, the suspend state can correspond to a D3 idle state (and corresponding link state (e.g., L2)), while the sleep state can corresponds to a D0 idle state (e.g., L1.2). The application processor logic 740 may receive the sleep request message 820 and indication of the modem's recommendation to enter a lower power idle state. The application processor logic 740 may be augmented to identify such a recommendation and determine whether to trigger a link state transition in accordance with the recommendation. In the example of FIG. 8B, the application processor logic sends a suspend acknowledgment 825 back to the modem 630, resulting in the modem entering the deep sleep state. The application processor then causes the interprocessor link state to transition from a D0/L0 state to a D3/L2 state 830 (e.g., $D3_{cold}$).

As shown in the examples of FIGS. 8A-8B, conventional sleep notification techniques can be augmented to account for an added policy decision made at the modem (e.g., by the communications processor) before messaging to the host is performed. For instance, the communications processor may determine the actual DRX settings corresponding to the network and request either a Sleep state (SleepStatusReg (SleepReq)) that remains in D0/L1.2 or a Suspend state (SleepStatusReg(SuspendReq)) that corresponds to entry into an ultra-low power D3 link state (e.g., L2). The decision to enter into a D0 or D3 idle state can be based on a specific cross-over point determined for the device based on the idle interval corresponding to the actual DRX state and the platform specific power figures for power state transitions and residency in power states. For instance, the crossover point (and sleep policy decision) can be calculated based on a formula:

$$(time_{L0toL2}*Power_{L0toL2}+time_{DRXidle}*Power_{D3}+time_{L2toL0}*Power_{L2toL0})/(time_{L0toL2}+time_{DRXidle}+time_{L2toL0})<(time_{L0toL1.2}*Power_{L0toL1.2}+time_{DRXidle}*Power_{L1.2}+time_{L1.2toL0}*Power_{L1.2toL0})/(time_{L0toL1.2}+time_{DRXidle}+time_{L1.2toL0})$$

where $time_{L0toL2}$ is the time to transition from L0 to L2 for the link; $Power_{L0toL2}$ is the power consumption rate for the transition from L0 to L2 for the link; $time_{DRXidle}$ is the current idle interval (e.g., as computed by the network and signaled to the endpoint device modem); $Power_{D3}$ is the power consumption while in a D3 state; $time_{L2toL0}$ is the time to transition from L2 to L0 for the link; $Power_{L2toL0}$ is the power consumption rate during the transition from L2 to L0; $time_{L0toL1.2}$ is the time to transition from L0 to L1.2 for the link; $Power_{L0toL1.2}$ is the power consumption rate during the transition from L0 to L1.2; $Power_{L1.2}$ is the power consumption while in a D0/L1.2 state; $time_{L1.2toL0}$ is the time to transition from L1.2 to L0 for the link; and $Power_{L1.2toL0}$ is the power consumption rate during the transition from L1.2 to L0. Each of the power consumption variables may each refer to either power consumption of the modem, the link, or the entire device, among other examples.

In the above example, the formula takes into account the power consumed during entry and exit of the corresponding low power states and the power consumed in each of the D3/L2 and D0/L1.2 states respectively. The timing and power values (e.g., $time_{L0toL2}$; $Power_{L0toL2}$; $Power_{D3}$; $time_{L2toL0}$; $Power_{L2toL0}$; $time_{L0toL12}$; $Power_{L0toL1.2}$; $Power_{L1.2}$; $time_{L1.2toL0}$; $Power_{L1.2toL0}$) may be implementation specific and constant on host- and device-side for each specific product implementation. Such implementation specific values may be measured for any given platform resulting in the determination of a simple threshold value from which subsequent policy decisions can be based. In this example, $time_{DRXidle}$ may be the only variable in the equation. Accordingly, a value of $time_{DRXidle}$ can be determined as a threshold value at (or above) which the equation is true and under which the equation is false. If the equation is true, it can be determined that the link should transition to a D3 link state; if false, it can be determined that the link should transition to a D0/L1.2 state. This threshold can be determined algebraically beforehand upon determination of the constant platform-specific power values, thereby allowing logic to implement the policy decision as a simple comparison of the actual (currently measured/0 DRX interval with the pre-determined threshold.

It should be appreciated that this is but one example (e.g., for a PCIe interprocessor link) and that in other implementations involving different systems and technologies, alternative formulas, potential power states, and policies may be employed, according to the more generalized principles described herein.

As shown in the above example, a modem can determine, based on network and other characteristics observable principally at the modem, that a link is to ideally enter a particular one of a plurality of available low power idle states. For instance, in PCIe applications, opportunities can be determined for enhanced power savings by entering a D3 low power state. However, in some cases, exit from a D3 (or other ultra-low power) link state may be expensive from a power perspective, limiting the instances in which the use of the lower power idle state should be used. For instance, in D3 and other examples, an exit from an ultra-low power state may require the full initialization of the connected device (e.g., the modem or another communications module) to complete the transition from the D3 to D0 device power state. For instance, in PCIe, upon exit from the $D3_{cold}$ state, software on the host side is tasked with first performing a full initialization of the Function in order to re-establish all functional context and restore the Function to its $D0_{active}$ state. Such reconfigurations of the waking communications module may not only be slow, but may involve multiple reconfiguration communications within the context of a transition that are performed in the highest link power state (e.g., L0), making the transition from D3 to D0 relatively power intensive compared to transitions from other power states. The power costs of traditional power state transitions may limit the general applicability of lower power states (e.g., D3 and L2).

Figure 9:
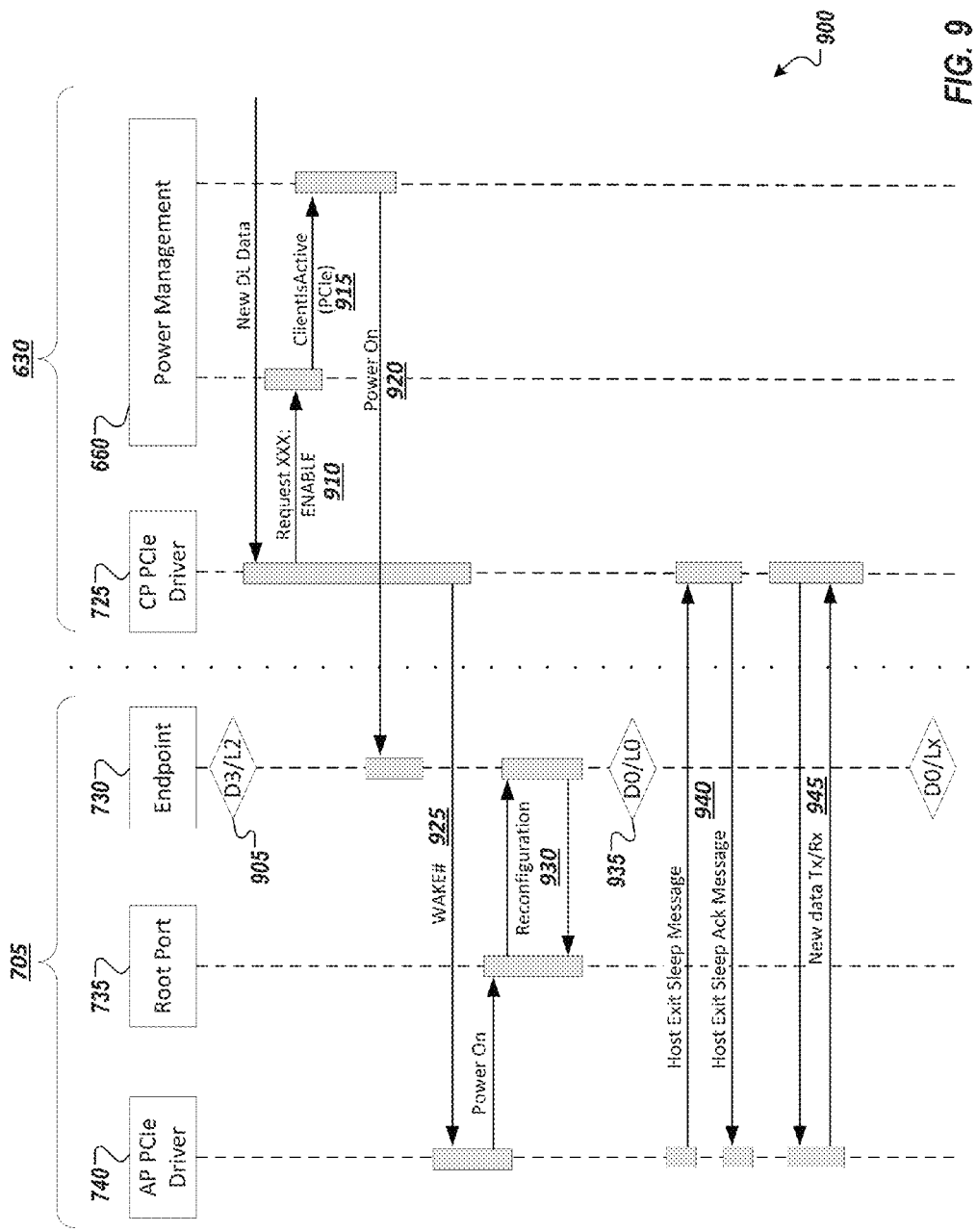
FIG. 9 is a simplified flow diagram illustrating a first example implementation of an exit from a particular low power device state.

For instance, in FIG. 9, a simplified flow diagram 900 is shown illustrating a conventional exit from a D3/L2 power state 905 to an active (or other, higher) power state (e.g., D0/L0, D0/L1.2, etc.). The flow shown in FIG. 9 may follow, for instance, the sending of a SleepCtrlReg(SuspendAck) acknowledgment by the application processor to the communications processor (such as shown it the example of FIG. 8B) and corresponding entry of the link into a D3/L2 state. During the D3/L2 state the PCIe driver 725 of the communications processor may be powered off and the modem may be in deep sleep (or another state). In one example, as new downlink data is received by the modem 630, a notification may be sent to the PCIe driver 725, causing an enable message 910 and a ClientIsActive message 915 to alert power management logic 660 and cause a power on message 920 to be sent to endpoint 730. Further, a wake message 925 (e.g., a PCIe WAKE# signal) may be sent from the communications processor's PCIe driver 725 to the application processor's PCIe driver 740 to wake the application processor and initiate a reconfiguration 930 of the modem in connection with a transition from a D3 power state 905. The wake signal 925 can further cause the link state transition to be triggered to bring the interprocessor link back up to an active state 935 to enable a wake handshake 940 and any additional data 945 (e.g., the newly received downlink data) to be transmitted over the active link.

As noted above, the re-initialization and reconfiguration process 930 included in a typical transition from a D3 state 905 to an active D0 state 935 may be an expensive process from a power and time perspective. Indeed, in some examples, the cost of this transition may be reflected within a formula relied upon in a sleep policy decision. For instance, in the example sleep policy decision policy introduced above in connection with the examples of FIGS. 8A-8B, the high cost of exit from a D3 state (e.g., reflected in $Power_{L2toL0}$ and $time_{L2toL0}$) may result in a correspondingly higher actual idle duration (e.g., $time_{DRXidle}$) threshold value, thereby reducing the likelihood that the formula will be found true to allow a decision and recommendation of entry into a D3 state entry by power management logic of the modem, among other examples.

In one implementation, a specialized mechanism for transitioning between a D3 device (and link) power state and a D0 device power state (and corresponding link state) may be provided that reduces the power costs of such transitions. In some implementations, this mechanism may be embodied as a capability that may be defined for a device to enhance (and cause a deviation from) a base specification of an interconnect protocol defining the base transition from D3. An enhanced D3 state transition can redefine responsibilities of the downstream component (e.g., the communications module and communications processor) and software on the host device (e.g., the root complex side and/or application processor). For instance, the enhanced D3 state transition can leverage an assumption that configuration of the downstream device (e.g., its PCIe configuration) is not likely to change after first power-on (e.g., a device form factor may provide for the application processor and communications processor are soldered on a single board and the PCIe connection is implemented using direct traces on the same board), and the functional context on D3 exit may be restored by the downstream component autonomously (i.e., without the typical interaction (e.g., reconfiguration process 930) between the downstream device and host (and host software) as in traditional reconfiguration. Indeed, a D3 state transition can minimize the relatively slow and costly interactions and involvement of the host and host software in reconfiguration of the downstream device on D3 exit.

Figure 10:
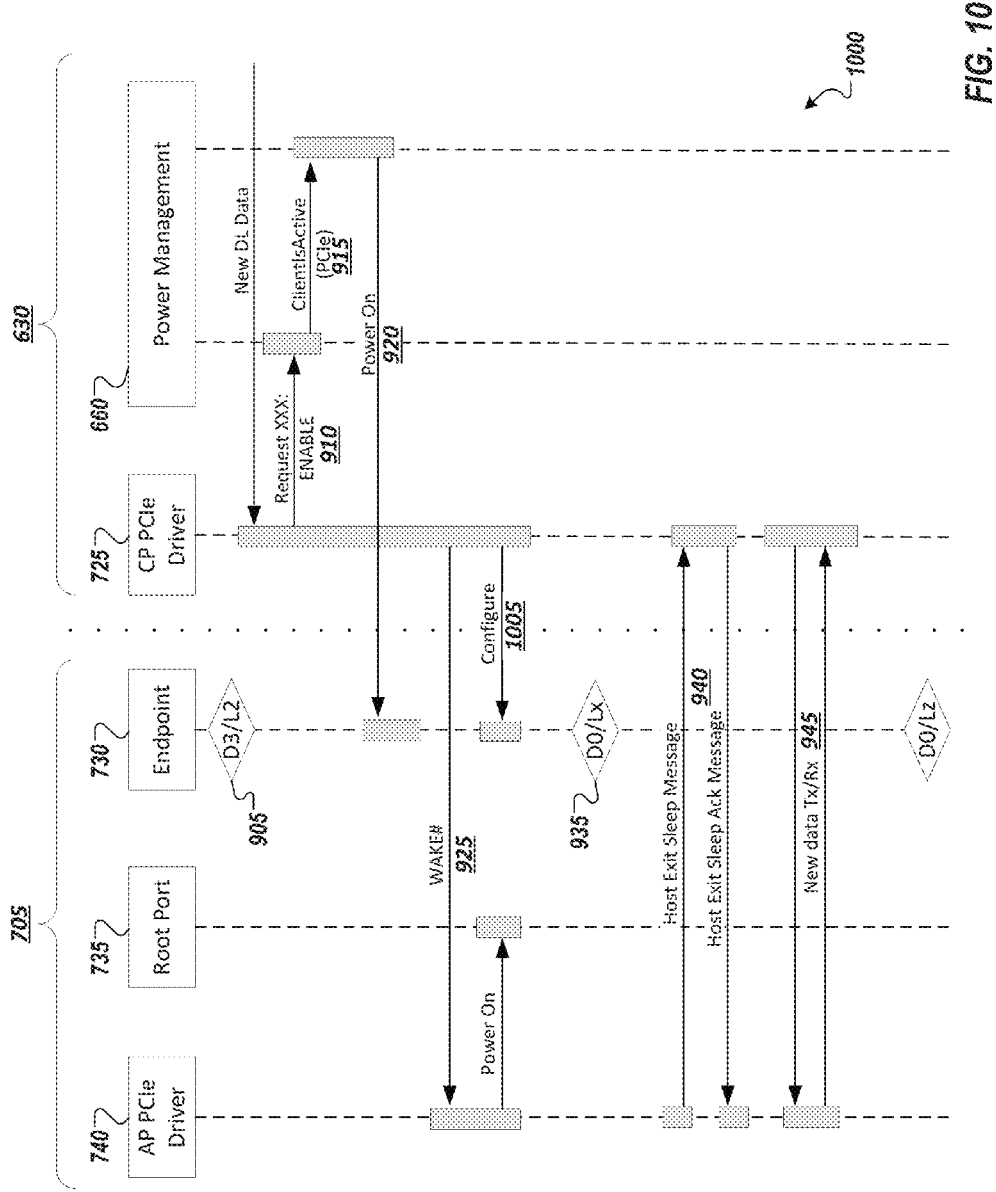
FIG. 10 is a simplified flow diagram illustrating a second example implementation of an exit from the particular low power device state.

For instance, as shown in the flow diagram 1000 of FIG. 10, an implementation of an enhanced transition from a D3 state, as initiated by a modem 630, is illustrated. As in the conventional approach, new downlink data may be detected at the modem 630 and a notification may be sent to the PCIe driver 725, causing an enable message 910 and a ClientIsActive message 915 to alert power management logic 660 and cause a power on message 920 to be sent to endpoint 730. A wake message may also be sent from the communications processor's PCIe driver 725 to the application processor's PCIe driver 740 to wake the application processor. However, rather than performing a full reconfiguration process at the host 705, the modem 630 can provide a saved copy of configuration information 1005 (i.e., from an earlier or original configuration of the modem and interprocessor link) directly to the configuration space on the device endpoint and/or host software (e.g., using the PCIe driver 725 of the communications processor). The configuration information may be identified (e.g., in PCIe link configuration space on the device) and copied by the modem 630 during the initial configuration of the interprocessor link following power-on. In an initial configuration, the host and host software may perform configuration (similar to the reconfiguration 930 in the example of FIG. 9). During this configuration, the modem 630 may access a register or request/receive the configuration information directly from the host 705 and store the configuration information in local modem memory for use in the event of an exit from a D3 state or other state whose exit requires a similar reconfiguration. In essence, the modem 630 may simply provide the host with the reconfiguration results without having the host spend the time and power to perform the actual reconfiguration. This may be possible given the processing and memory storage resources of the modem (differentiating it from other types of endpoints and peripherals connected to the application processor) as well as the reality that in many modern communication devices, the option does not exist to change the mix of endpoints on the device or hot plug devices to the communication device. In many instances, the modem (and other components) may be permanently fastened and connected (e.g., soldered) to the application processor and/or its root port. This reality can be exploited by enabling an enhanced D3 exit capability that take advantage of the assumption that configurations of links between certain pairs of components on a device are likely to never change over the lifespan of a device. Accordingly, reconfiguration requirement (e.g., provided to support hot-plugging or other use cases) in general purpose input/output (I/O) technologies, such as PCIe, may be superfluous to other applications, such as handheld mobile devices, IoT devices, wearables, and other current and emerging examples.

Figure 11:
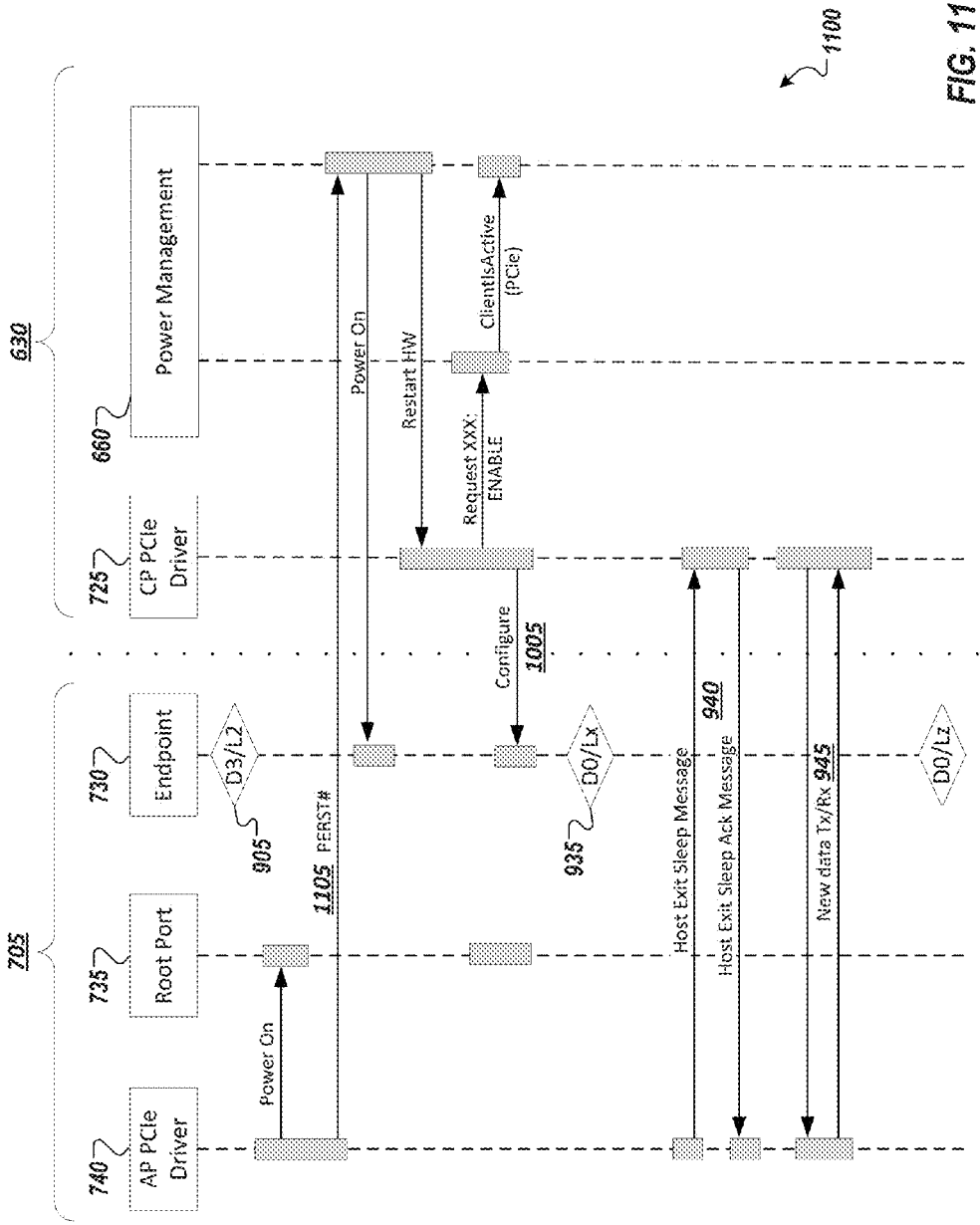
FIG. 11 is a simplified flow diagram illustrating a third example implementation of an exit from the particular low power device state.

FIG. 11 is a simplified flow diagram 1100 illustrating another example of an enhanced D3 exit, this time as initiated by the host (e.g., in connection with uplink data or the detection of other data to send from the application processor to the communication processor). For instance, the host 705 may signal the modem 630 through a reset or other signal 1105 (e.g., a PCIe PERST# signal) while the interprocessor link is still in D3/L2 905. In response to receiving the reset signal 1105, the power management logic 660 of the modem 630 can reactivate its PCIe stack and also send stored configuration information 1005 directly to the host 705 to allow the host and host software to omit the conventional reconfiguration process utilized in typical D3 exits (as was also the case in the example of FIG. 10). Accordingly, as seen in the examples of FIGS. 10 and 11, the lengthy reconfiguration over a PCIe link (by host software) during a transition from D3 to D0 can be replaced by a much quicker local configuration driven and provided by the modem side 630, using configuration information saved upon D3 entry on the modem 630.

As discussed above, a modem can determine, from multiple available low power idle states, a preferable one of the states (e.g., D0/L1.2 or D3/L2) and recommend this state to the application processor. This feature may take advantage of the relatively unique capabilities and features of modems, relative to other devices, which may connect to and interact with an application processor. Indeed, operation of an application processor (or host) and a modem (e.g., a LTE modem) via a PCIe interprocessor link may be different than the traditional perception of a PCIe attached device. On traditional systems a downstream component may have limited independent processing power and logic, with D-states (triggered by the application processor) always applying to and driving functionality of the complete device. However, in some modem implementations, D-states may only apply in connection with the link state connecting the modem to the application processor. The modem, unlike some other devices, may have storage facilities, complex software running under a real time operating system (RTOS), and power and state management logic managing its power states, in large part, independently of the host system (and application processor). For instance, DRX modes may be managed autonomously by the modem, including setting the modem in a paging DRX state when in idle mode after detecting or predicting a prolonged time of air interface inactivity, among other examples. For instance, the modem may go to sleep between two paging messages, which could possibly contain a command for the modem to wake up again and change back to Connected state. The wake-up and interaction with cellular network can be carried out largely autonomously by the modem and independent from the host power state. For instance, interactions between the modem and a network may even feasibly take place when its PCIe link to the application processor is in a D3cold state. Indeed, this link may only need to be brought back to D0 active when downlink data is received by the modem and is to be forwarded to the application processor, among other examples.

In addition to possessing the ability to select a desired low power idle state, a modem may additional possess the ability to support an enhanced low power exit, such as described and introduced in connection with the example illustrated in FIGS. 10-11. Conventional exits may also be used. Indeed, modem support of an enhanced low power exit may be optional. For instance, enhanced low power exit may be provided as an enhanced capability (e.g., to augment base functionality defined for a particular interconnect technology (e.g., PCIe)). For instance, capability registers may be provided through which a modem can announce (to the host and host software) that it possesses the enhanced low power exit functionality. In one example, a PCIe Device Capabilities Register may be provided with a field to indicate that the modem can support the enhanced low power exit, such as an enhanced D3 exit where the modem provides restoration of configuration on D3 exit to the host (in lieu of a reconfiguration process performed by the host). For instance, in PCIe, bit position 29 at Device Capabilities Register (Offset 04 h) or bit position 24 at Device Capabilities 2 Register (Offset 24 h) may be designated to announce support of the enhanced low power exit capability, among other potential implementations.

Figure 12A:
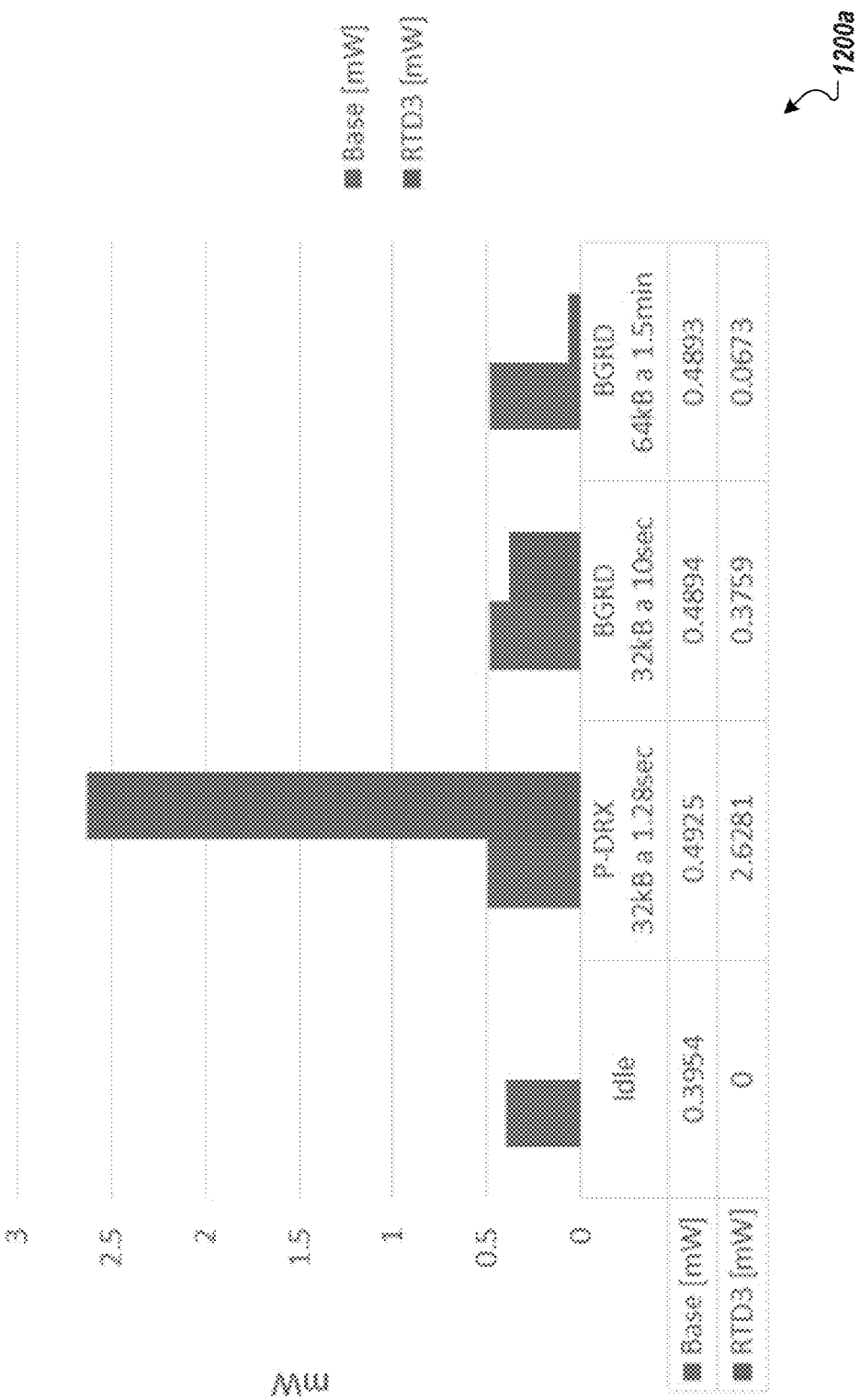
FIGS. 12A-12B are graphs showing a comparison of power consumption between different low power device power states.
Figure 12B:
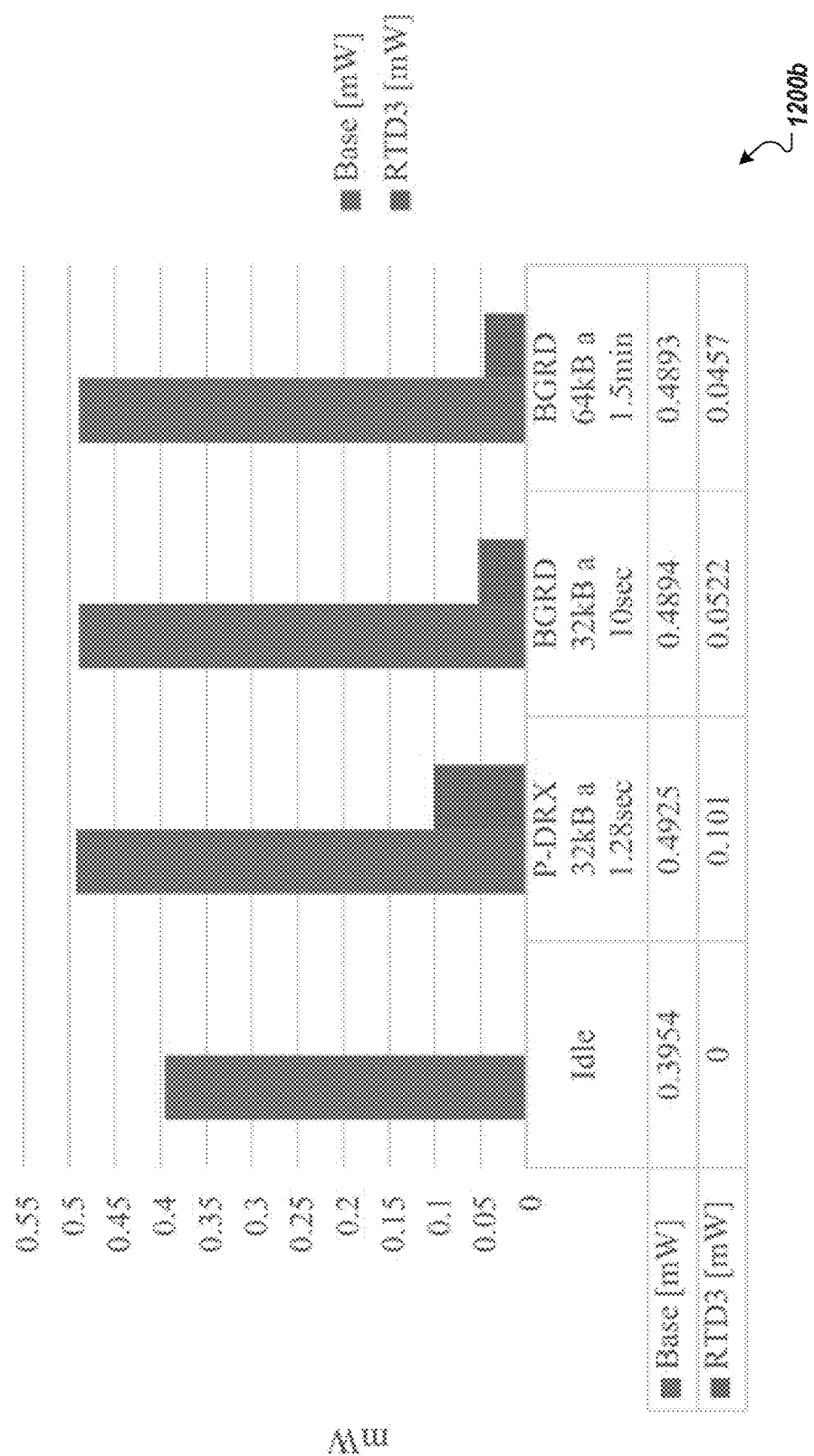

FIGS. 12A-12B show graphs 1200a-b illustrating comparisons of power consumptions between a link's transition between L0 and L1.2 (or "Base") in D0 and a transition between link states in D0 and D3 (e.g., Runtime D3 (RTD3)). Each of the graphs of FIGS. 12A-12B shows the respective power consumption on the (PCIe) link-side of the modem for various transfer intervals. In these particular examples, results are shown for an example PCIe power model which has been calibrated against measurements (although other platforms may be utilized in other examples). The configuration time shown in the graphs in L0 during D3 exit has been measured with various host devices, with the model value provided at a minimal value of 50 ms. As shown in the example graphs 1200a-b, on the Base-side the power consumption is dominated by power consumption during the L1.2 state. On RTD3 side the power consumption is dominated by the power consumed during D3 exit. As shown in the example graphs 1200a-b, traditional entry into the powerless $D3_{cold}$ state becomes beneficial only for longer idle times. For instance, the graph 1200a illustrates a comparison of the power consumption using a D0/L1.2 state (Base) and a conventional D3 state (RTD3) (using conventional D3 exit), with the use of the D3 state only becoming beneficial after a greater than 10 second idle interval. The graph 1200b of FIG. 12B, on the other hand, illustrates a similar comparison where use of D3 is altered to implement an enhanced D3 exit (such as introduced above in the examples of FIGS. 10-11). As shown in the example graph 1200b, utilizing cached configuration data provided by the modem (in lieu of a full reconfiguration) during D3 exit can result in a dramatic reduction in D3 exit time. Accordingly, use of D3, from a power consumption perspective, may become advantageous (e.g., over a D0/L1.2 idle) for paging DRX intervals of 1 sec and less. Such an improvement in this use case may yield a power reduction of 2600% over systems where traditional RTD3 is utilized.

It should be noted that while much of the above principles and examples are described within the context of PCIe and particular revisions of the PCIe specification, the principles, solutions, and features described herein can be equally applicable to other protocols, states, state machines, and systems, such as MIPI LLI or others. Further, alternative mechanisms and structures, different from those explicitly illustrated and described, may be used to provide functionality and logic according to the principles discussed herein.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
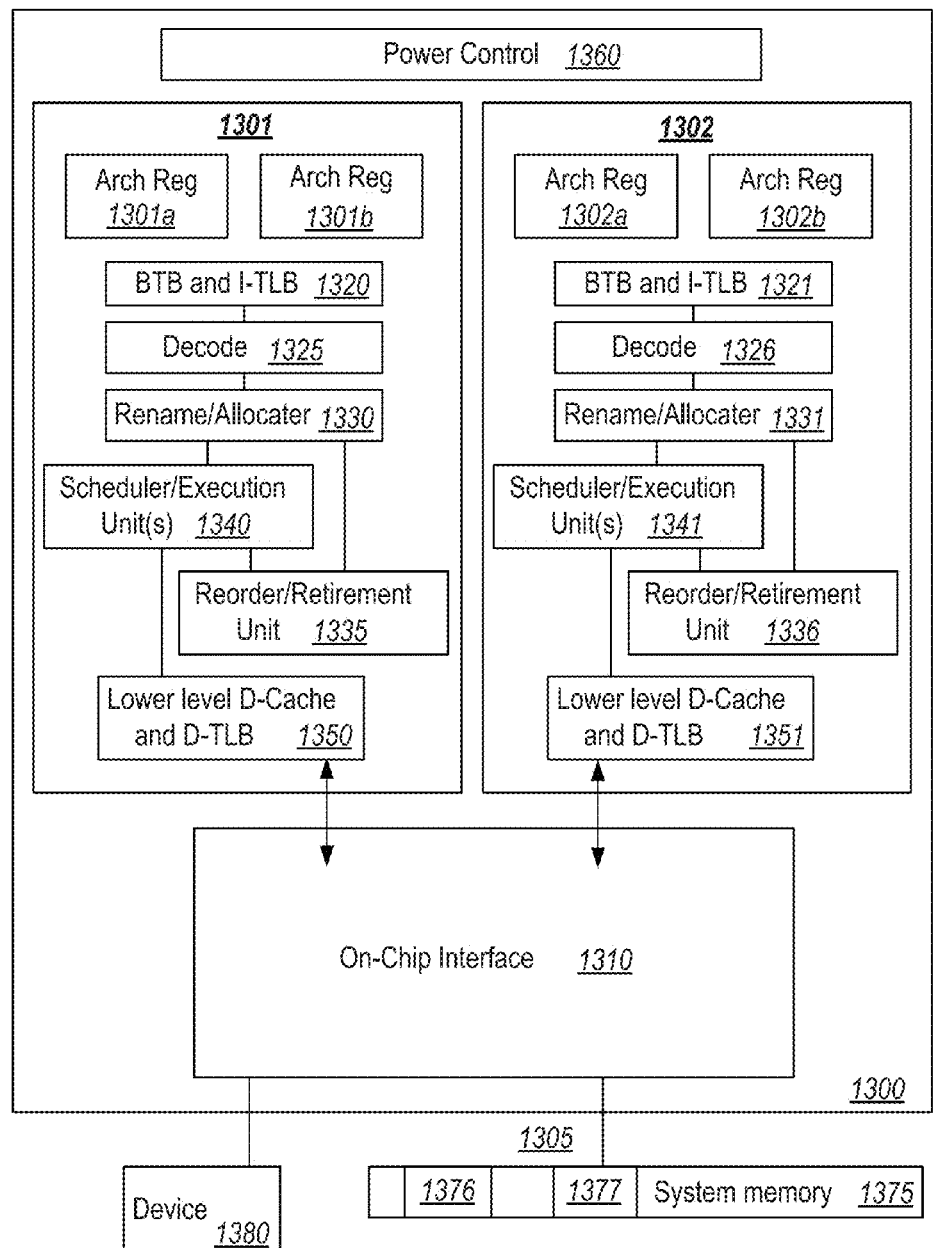
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301a, a second thread is associated with architecture state registers 1301b, a third thread may be associated with architecture state registers 1302a, and a fourth thread may be associated with architecture state registers 1302b., Here, each of the architecture state registers (1301a, 1301b, 1302a, and 1302b) may be referred to as processing elements, thread slots, or thread units, as described above. As illustrated, architecture state registers 1301a are replicated in architecture state registers 1301*b,* so individual architecture states/contexts are capable of being stored for logical processor 1301*a* and logical processor 1301*b*. In core 1301, other smaller resources, such as instruction pointers and renaming logic in allocator and renamer block 1330 may also be replicated for threads 1301*a* and 1301*b*. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301*a,* 1301*b,* respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301*a* and 1301*b* are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a communication module (e.g., hosting a communications processor), graphic accelerator, processor or card coupled to a memory controller hub, data storage coupled to an I/O controller hub, a wireless transceiver, a flash device, an audio controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or other device 1380 (e.g., a communication modules). The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
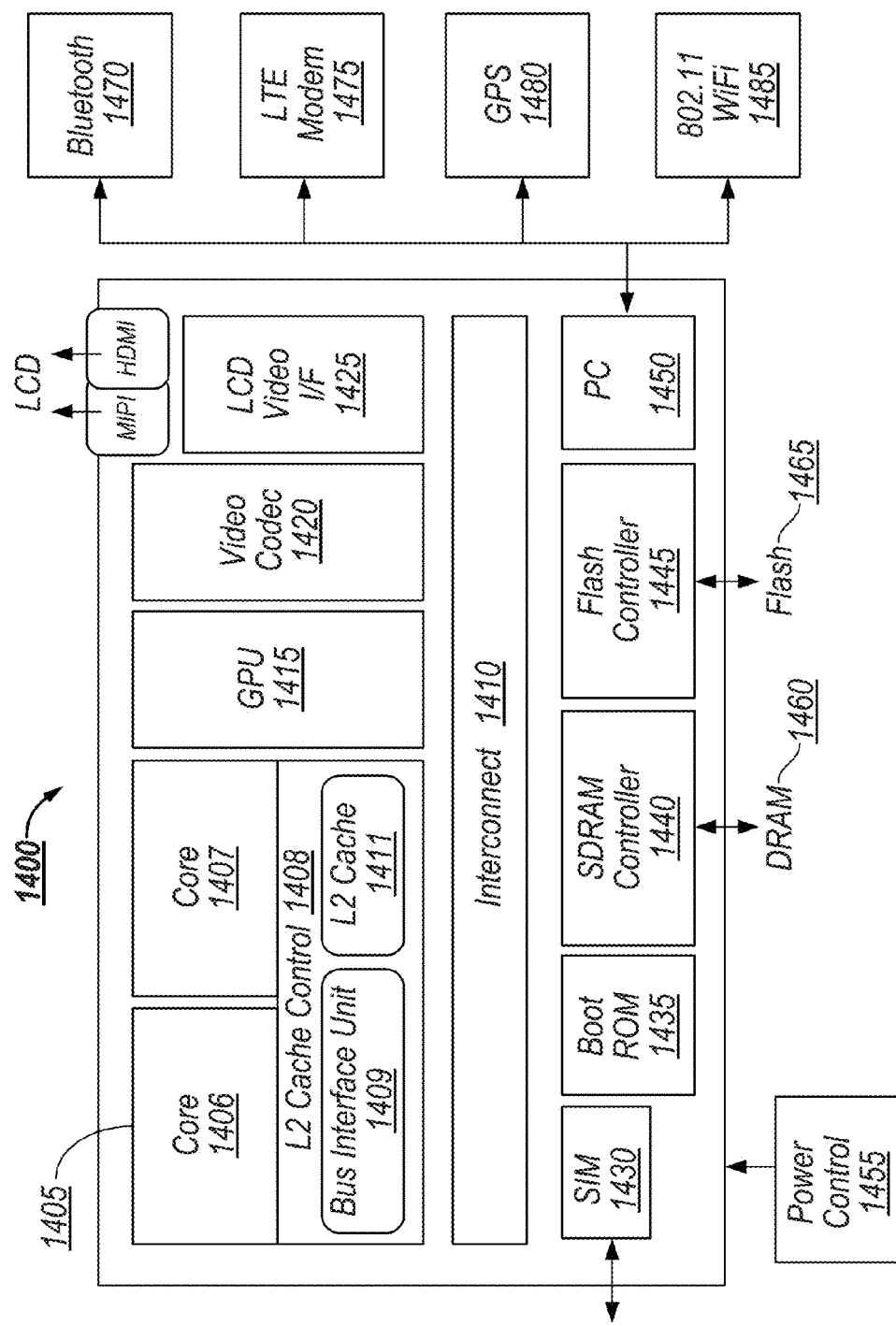
FIG. 14 illustrates an example system implemented as system on chip (SoC).

Turning next to FIG. 14, an embodiment of a system on-chip (SOC) design in accordance with the inventions is depicted. As a specific illustrative example, SOC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1400 has a processor 1405 (e.g., an application processor) including two or more cores (e.g., 1406 and 1407). Similar to the discussion above, cores 1406 and 1407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1411 to communicate with other parts of system 1400. Interconnect 1410 includes an on-chip interconnect, such as an IOSF, AMBA, or other interconnect discussed above, which potentially implements one or more aspects of described herein.

Interface 1410 provides communication channels to the other components, such as a Subscriber Identity Module (SIM) 1430 to interface with a SIM card, a boot rom 1435 to hold boot code for execution by cores 1406 and 1407 to initialize and boot SOC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the invention described herein.

In addition, the system illustrates peripherals for communication, such as a Bluetooth module 1470, LTE modem 1475 (or other communications module (e.g., hosting a communications processor), GPS 1485, and WiFi 1485. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Aspects of the embodiments can include one or a combination of the following examples:

Example 1 is an apparatus including a modem including a communications processor and power management logic. The power management logic may be executable by the communications processor to identify an idle condition associated with a data network to be accessed using the modem; determine an opportunity to enter a first low power device state based on the idle condition, where the first low power device state is one of a set of supported low power device states, the set of low power device states further includes a second low power device state, and a host device consumes less power in the first low power device state than in the second low power device state; send a notification to an application processor of the host device that the modem is to enter a sleep state, where the notification identifies the first low power device state; and enter a low power link state corresponding to the first low power device state based on a signal from the application processor, where the low power link state applies to a link coupling the communications processor to the application processor.

Example 2 may include the subject matter of example 1, where the sleep state is independent of the set of low power device states.

Example 3 may include the subject matter of example 2, where the sleep state corresponds to an activity level of a network to which the modem is to connect.

Example 4 may include the subject matter of example 3, where determine an idle interval corresponding to the activity level of the network, and the opportunity is determined based on the idle interval.

Example 5 may include the subject matter of example 4, where the idle interval corresponds to a paging interval of the network.

Example 6 may include the subject matter of any one of examples 4-5, where the opportunity is determined based on the idle interval falling above a threshold interval value determined for the host device, and the second low power device state is to be requested for intervals falling below the threshold interval value.

Example 7 may include the subject matter of any one of examples 1-6, where the link includes a Peripheral Component Interconnect Express (PCIe)-compliant link.

Example 8 may include the subject matter of example 7, where the set of low power device states include PCIe low power device states, the first low power device state includes a D3 state, and the second low power device state includes a D0 state, and the low power link state includes one of a plurality of PCIe low power link states.

Example 9 may include the subject matter of example 8, where the first low power device state includes a D3cold power state.

Example 10 may include the subject matter of any one of examples 8-9, where the low power link state includes a L2 link state and another one of the plurality of PCIe low power link states includes a L1.2 link state corresponding to the second device power state.

Example 11 may include the subject matter of any one of examples 1-10, where the power management logic is further executable to: identify an exit from the first low power device state; access configuration data stored in local memory of the modem; and send the configuration data to the host device for use in lieu of a reconfiguration performed by host software during the exit from the first low power device state.

Example 12 may include the subject matter of any one of examples 1-11, further including the host device and the application processor.

Example 13 may include the subject matter of any one of examples 1-12, where identification of the first low power device state is appended to the notification.

Example 14 is an apparatus including a modem, which includes a communications processor and link state logic executable by the communications processor to: enter a particular low power link state associated with a link to couple the communications processor to an application processor of a host device, where the particular low power link state is a lower powered one of a plurality of low power link states available for the link; identify an exit from the particular low power link state; and access, from local memory of the modem, configuration data to provide to the host device during the exit, where the configuration data is provided to the host device for use in lieu of a reconfiguration performed by host software during the exit from the particular low power device state.

Example 15 may include the subject matter of example 14, where the configuration data includes a copy of configuration information generated by the host software during an initial configuration of the link.

Example 16 may include the subject matter of any one of examples 14-15, where the link includes a Peripheral Component Interconnect Express (PCIe)-compliant link and the particular low power link state includes a D3 low power link state.

Example 17 may include the subject matter of any one of examples 14-16, where a capability register indicates that the modem is to provide the configuration data during exits from the particular low power link state.

Example 18 may include the subject matter of any one of examples 14-17, where entry into the particular low power link state is based on a hint generated by power management logic of the modem based on an idle condition of a network to which the modem is to connect.

Example 19 may include the subject matter of example 18, where entering the particular low power link state includes: identifying the idle condition; determining an opportunity to enter the particular low power link state based on the idle condition; sending a notification to the application processor of the host device that the modem is to enter a sleep state, where the notification identifies particular low power link state; and entering the particular low power link state based on a signal from the application processor.

Example 20 may include the subject matter of example 19, where the idle condition includes a sleep state of the modem and the sleep state is independent of the plurality of low power link states.

Example 21 may include the subject matter of any one of examples 19-20, where the modem is to determine an idle interval corresponding to the idle condition, and the opportunity is determined based on the idle interval.

Example 22 may include the subject matter of example 21, where the idle interval corresponds to a paging interval of the network.

Example 23 may include the subject matter of any one of examples 21-22, where the opportunity is determined based on the idle interval falling above a threshold interval value determined for the host device, and the second low power device state is to be requested for intervals falling below the threshold interval value.

Example 24 may include the subject matter of any one of examples 14-23, further including the host device and the application processor.

Example 25 is a system including a host device, which includes an application processor and a modem to couple the host device to a wireless data network. The modem is coupled to the application processor by a link and the modem further includes a communications processor and power management logic. The power management logic is executable by the communications processor to: identify an idle condition associated with the data network; determine that a first low power device state should be entered based on the idle condition, where the first low power device state is a low powered one of a plurality of available low power device states; and send a notification to an application processor of the host device that the modem is to enter a sleep state associated with the idle condition, where the notification includes a hint for the link to enter a particular link state associated with the first low power device state, and the sleep state is independent of the plurality of low power device states; and link state logic executable by the communications processor to enter the particular low power link state corresponding to the first low power device state based on a signal from the application processor.

Example 26 may include the subject matter of example 25, where the host device further includes: host software to perform a reconfiguration of the link during an exit from the particular low power link state and a configuration register to indicate a particular capability of the modem. The link state logic of the modem is further to: identify an exit from the particular low power link state; access, from local memory of the modem, configuration data from a previous configuration of the link; provide the configuration data for use during the exit, where the configuration data is provided for use in lieu of the reconfiguration of the link by the host software during the exit from the particular low power device state based on the particular capability.

Example 27 may include the subject matter of any one of examples 25-26, where the sleep state is independent of the set of low power device states.

Example 28 may include the subject matter of example 27, where the sleep state corresponds to an activity level of a network to which the modem is to connect.

Example 29 may include the subject matter of example 28, where the power management logic is further to determine an idle interval corresponding to the activity level of the network, and the opportunity is determined based on the idle interval.

Example 30 may include the subject matter of example 29, where the idle interval corresponds to a paging interval of the network.

Example 31 may include the subject matter of any one of examples 29-30, where the opportunity is determined based on the idle interval falling above a threshold interval value determined for the host device, and the second low power device state is to be requested for intervals falling below the threshold interval value.

Example 32 may include the subject matter of any one of examples 25-31, where the link includes a Peripheral Component Interconnect Express (PCIe)-compliant link.

Example 33 may include the subject matter of example 32, where the set of low power device states include PCIe low power device states, the first low power device state includes a D3 state, and the second low power device state includes a D0 state, and the low power link state includes one of a plurality of PCIe low power link states.

Example 34 may include the subject matter of example 33, where the first low power device state includes a D3 cold power state.

Example 35 may include the subject matter of any one of examples 33-34, where the low power link state includes a L2 link state and another one of the plurality of PCIe low power link states includes a L1.2 link state corresponding to the second device power state.

Example 36 may include the subject matter of any one of examples 25-35, where identification of the first low power device state is appended to the notification.

Example 37 is a method including identifying an idle condition associated with a data network to be accessed using a modem including a communications processor, determining an opportunity to enter a first low power device state based on the idle condition, where the first low power device state is one of a set of supported low power device states, the set of low power device states further includes a second low power device state, and a host device consumes less power in the first low power device state than in the second low power device state, sending a notification to an application processor of the host device that the modem is to enter a sleep state, where the notification identifies the first low power device state, and entering a low power link state corresponding to the first low power device state based on a signal from the application processor, where the low power link state applies to a link coupling the communications processor to the application processor.

Example 38 may include the subject matter of example 37, where the sleep state is independent of the set of low power device states.

Example 39 may include the subject matter of example 38, where the sleep state corresponds to an activity level of a network to which the modem is to connect.

Example 40 may include the subject matter of example 39, further including determining an idle interval corresponding to the activity level of the network, and the opportunity is determined based on the idle interval.

Example 41 may include the subject matter of example 40, where the idle interval corresponds to a paging interval of the network.

Example 42 may include the subject matter of example 40-41, where the opportunity is determined based on the idle interval falling above a threshold interval value determined for the host device, and the second low power device state is to be requested for intervals falling below the threshold interval value.

Example 43 may include the subject matter of example 37-42, where the link includes a Peripheral Component Interconnect Express (PCIe)-compliant link.

Example 44 may include the subject matter of example 43, where the set of low power device states include PCIe low power device states, the first low power device state includes a D3 state, and the second low power device state includes a D0 state, and the low power link state includes one of a plurality of PCIe low power link states.

Example 45 may include the subject matter of example 44, where the first low power device state includes a D3cold power state.

Example 46 may include the subject matter of example 44-45, where the low power link state includes a L2 link state and another one of the plurality of PCIe low power link states includes a L1.2 link state corresponding to the second device power state.

Example 47 may include the subject matter of example 37-46, further including: identifying an exit from the first low power device state; accessing configuration data stored in local memory of the modem; and send the configuration data to the host device for use in lieu of a reconfiguration performed by host software during the exit from the first low power device state.

Example 48 may include the subject matter of example 37-47, where identification of the first low power device state is appended to the notification.

Example 49 is a system including means to perform the method of any one of examples 37-48.

Example 50 may include the subject matter of example 49, where the means include a computer readable medium with instructions stored thereon, and the instructions are executable by a machine to cause the machine to perform the method of any one of examples 37-48.

Example 51 may include the subject matter of example 50, where the machine includes the communications processor.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a modem comprising:
        a communications processor; and
        power management logic executable by the communications processor to:
            identify an idle condition associated with a data network to be accessed using the modem;
            determine an opportunity to enter a first low power device state based on the idle condition, wherein the first low power device state is one of a set of supported low power device states, the set of low power device states further comprises a second low power device state, and a host device consumes less power in the first low power device state than in the second low power device state;
            send a notification to an application processor of the host device that the modem is to enter a sleep state, wherein the notification identifies the first low power device state; and
            enter a low power link state corresponding to the first low power device state based on a signal from the application processor, wherein the low power link state applies to a link coupling the communications processor to the application processor.

2. The apparatus of claim 1, wherein the sleep state is independent of the set of low power device states.

3. The apparatus of claim 2, wherein the sleep state corresponds to an activity level of a network to which the modem is to connect.

4. The apparatus of claim 3, wherein the power management logic is further to determine an idle interval corresponding to the activity level of the network, and the opportunity is determined based on the idle interval.

5. The apparatus of claim 4, wherein the idle interval corresponds to a paging interval of the network.

6. The apparatus of claim 4, wherein the opportunity is determined based on the idle interval falling above a threshold interval value determined for the host device, and the second low power device state is to be requested for intervals falling below the threshold interval value.

7. The apparatus of claim 1, wherein the link comprises a Peripheral Component Interconnect Express (PCIe)-compliant link.

8. The apparatus of claim 7, wherein the set of low power device states comprise PCIe low power device states, the first low power device state comprises a D3 state, and the second low power device state comprises a D0 state, and the low power link state comprises one of a plurality of PCIe low power link states.

9. The apparatus of claim 8, wherein the first low power device state comprises a $D3_{cold}$ power state.

10. The apparatus of claim 8, wherein the low power link state comprises a L2 link state and another one of the plurality of PCIe low power link states comprises a L1.2 link state corresponding to the second device power state.

11. The apparatus of claim 1, wherein the power management logic is further executable to:
    identify an exit from the first low power device state;
    access configuration data stored in local memory of the modem; and
    send the configuration data to the host device for use in lieu of a reconfiguration performed by host software during the exit from the first low power device state.

12. The apparatus of claim 1, further comprising the host device and the application processor.

13. The apparatus of claim 1, wherein identification of the first low power device state is appended to the notification.

14. An apparatus comprising:
    a modem comprising:
        a communications processor; and
        link state logic executable by the communications processor to:
            enter a particular low power link state associated with a link to couple the communications processor to an application processor of a host device, wherein the particular low power link state is a lower powered one of a plurality of low power link states available for the link;
            identify an exit from the particular low power link state;
            access, from local memory of the modem, configuration data to provide to the host device during the exit, wherein the configuration data is provided to the host device for use in lieu of a reconfiguration performed by host software during the exit from the particular low power device state.

15. The apparatus of claim 14, wherein the configuration data comprises a copy of configuration information generated by the host software during an initial configuration of the link.

16. The apparatus of claim 14, wherein entry into the particular low power link state is based on a hint generated by power management logic of the modem based on an idle condition of a network to which the modem is to connect.

17. The apparatus of claim 14, wherein the link comprises a Peripheral Component Interconnect Express (PCIe)-compliant link and the particular low power link state comprises a D3 low power link state.

18. The apparatus of claim 14, wherein a capability register indicates that the modem is to provide the configuration data during exits from the particular low power link state.

19. A system comprising:
    a host device comprising:
        an application processor; and a modem to couple the host device to a wireless data network, wherein the modem is coupled to the application processor by a link and the modem further comprises:
  a communications processor; and
  power management logic executable by the communications processor to:
    identify an idle condition associated with the data network;
    determine that a first low power device state should be entered based on the idle condition, wherein the first low power device state is a low powered one of a plurality of available low power device states; and
    send a notification to an application processor of the host device that the modem is to enter a sleep state associated with the idle condition, wherein the notification comprises a hint for the link to enter a particular link state associated with the first low power device state, and the sleep state is independent of the plurality of low power device states; and
  link state logic executable by the communications processor to enter the particular low power link state corresponding to the first low power device state based on a signal from the application processor.

20. The system of claim 19, wherein the host device further comprises:
  host software to perform a reconfiguration of the link during an exit from the particular low power link state; and
  a configuration register to indicate a particular capability of the modem;
  wherein the link state logic of the modem is further to:
    identify an exit from the particular low power link state;
    access, from local memory of the modem, configuration data from a previous configuration of the link;
    provide the configuration data for use during the exit, wherein the configuration data is provided for use in lieu of the reconfiguration of the link by the host software during the exit from the particular low power device state based on the particular capability.

* * * * *